(12) United States Patent
Parker et al.

(10) Patent No.: US 6,906,836 B2
(45) Date of Patent: Jun. 14, 2005

(54) FULL COLOR HOLOGRAPHIC IMAGE COMBINER SYSTEM

(76) Inventors: William Parker, P.O. Box 1508, Waitsfield, VT (US) 05673; Julie Parker, P.O. Box 1508, Waitsfield, VT (US) 05673

( * ) Notice: Subject to any disclaimer, the term of this patent is extended or adjusted under 35 U.S.C. 154(b) by 22 days.

(21) Appl. No.: 10/264,862

(22) Filed: Oct. 4, 2002

(65) Prior Publication Data

US 2004/0066547 A1 Apr. 8, 2004

(51) Int. Cl.$^7$ .............................................. G02B 5/32
(52) U.S. Cl. .............................. 359/15; 359/13; 359/27; 345/7
(58) Field of Search .................... 359/13–15, 32–33, 359/27; 345/7–9

(56) References Cited

U.S. PATENT DOCUMENTS 5,187,597 A * 2/1993 Kato et al. ................... 359/22
5,475,512 A * 12/1995 Nakazawa et al. ............ 359/13
5,859,714 A * 1/1999 Nakazawa et al. ............ 359/13
2002/0154349 A1 * 10/2002 Halldorsson et al. ......... 359/15

OTHER PUBLICATIONS

Handbook of Optics, M.Bass Editor, vol. I, pp. 10.42–10.43, McGraw–Hill(1995).*

* cited by examiner

Primary Examiner—Leonidas Boutsikaris
(74) Attorney, Agent, or Firm—James Marc Leas

(57) ABSTRACT

A device, such as a heads up display, includes equipment for generating a virtual image in the field of view of an observer. The equipment includes at least one light source having a wavelength range less than 2 nm. The light source can be a low pressure gas discharge lamp. The device also includes a holographic optical element that provides a virtual image. The device also includes an image source, such as a mask or an LCD. In one embodiment the holographic optical element combines an image on a display with an ambient image. The holographic element provides multiple colors undistorted in a virtual image appearing to the observer as converging from the same distance.

56 Claims, 8 Drawing Sheets

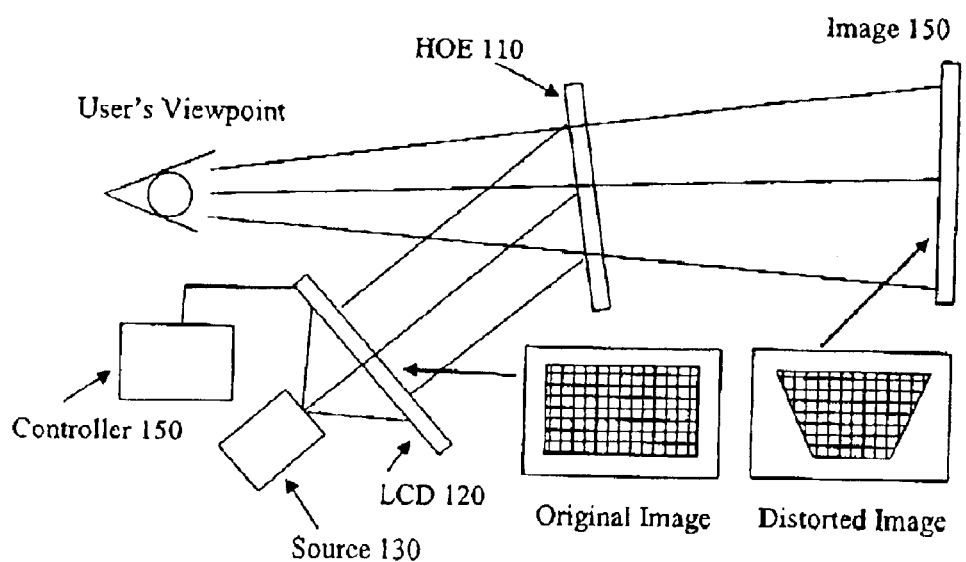
Figure 7. Affect of HOE Distortion on Image 150

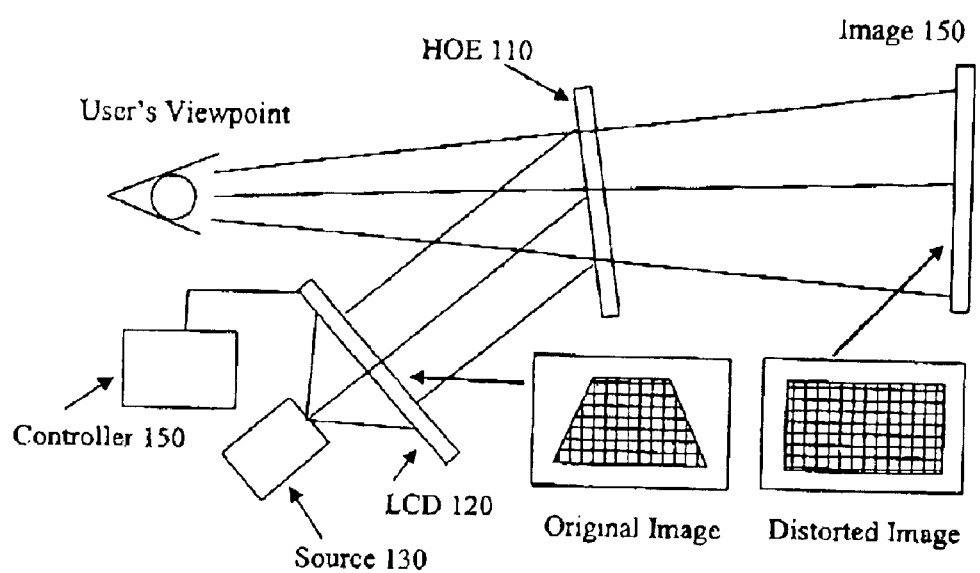
Figure 8. Affect of Anamorphic Distortion of LCD on Image 150

FULL COLOR HOLOGRAPHIC IMAGE COMBINER SYSTEM

This application claims priority of provisional patent application No. 60/327,377, filed on Oct. 4, 2001.

FIELD OF THE INVENTION

This invention generally relates to image generation. More particularly, it relates to a display that provides an image that overlaps a field of view. Even more particularly, it relates to a heads up display (HUD) for providing information to a viewer overlapping a scene.

BACKGROUND OF THE INVENTION

Heads up displays (HUD's) have been well known for many years, and are used or are being considered for use in many applications including medical, scientific data visualization, aircraft, automobiles, boats, large farm equipment, and heavy-duty construction equipment. In a vehicular application, the driver can see the HUD in the field of view along with the road ahead and real objects on or near the road. Thus, using a HUD, an automobile driver can see the instrument panel superimposed on road without having to glance away to the display, focus on the display and then having to look back and refocus to the road. This saves eye-strain and improves driver performance.

Existing heads up displays create an image that is projected into the field of view of a user so that the user can glance at the projected image whenever the information contained in the image is needed. The existing systems typically use lenses that direct an image towards a partially transparent surface through which the user views the scene, so that the user sees both the scene and the virtual image that appears to be located on the other side of the partially transparent surface. Many existing systems use broadband light and require very expensive lens assemblies to form color corrected images. Holographic systems are an inexpensive solution to the color correction problem, but they can introduce image blurring due to bandwidth generated problems. Additionally, the bandwidth of the light source limits the perceived depth of the image, with a wide bandwidth light source requiring the image to be placed close to the observer to minimize image distortions and blur. Consequently, users must still change their focus whenever they wish to view the projected image. The need to change one's focus from a distant object to a nearby object takes time, typically several tens of milliseconds (or longer for older people, viz., people with presbyopia). Such delays can constitute a significant safety issue, especially in situations where events occur very rapidly, e.g. in automobiles and aircraft, as well as in situations where the shear size and scale of the applications can put others at risk very quickly in spite of relatively slow moving equipment, e.g. equipment in construction zones and boats). What is needed is a way to seamlessly integrate the display into the scene at a distance comparable to the distance of the scene.

In addition, existing systems are expensive, often requiring lenses that cost thousands of dollars. For example, the Sim Eye XL100A from Rockwell Collins costs $87,500 each.[1]

[1] http://www.keo.com/SIMEYE100A.htm

Heads up displays can be categorized into low information content displays and high information content displays. Low information content displays include, for example, on/off indicators and turn signal indicators. High information content displays include, for example, text using 12 point font, video images and the like. The bulk of existing systems and publications and patents were developed for low information content systems because the technology for high information content systems has not been sufficiently developed for field use. The difference between high and low information content displays is significant because high information content displays require high resolution that is not feasible in low information content systems. Low information content systems do not require high resolution, therefore do not require a low bandwidth illumination source and hence can be inexpensive.

In addition, HUDs can also be categorized as being fixed HUDs or as mobile HUDs. Fixed HUDs are mounted to a structural member, and the user is positioned, for example, in a seat that affords the user a view of the image formed using the HUD. An example of a mobile HUD is a helmet mounted HUD. Another example is eye-wear that includes display optics that allow a user to view, for example, a computer monitor as an image projected in front of the user.

A closely related technology is virtual reality (VR) technology, which can be categorized as 100% VR where everything seen by the user is created and nothing viewed by the user is "real". Applications include simulators and video games. A related VR technology is augmented virtual reality (AVR), where information is projected into the field of view that is derived in part from local information content. This invention more specifically relates to AVR, but it should be apparent that it can also be used in VR applications.

U.S. Pat. No. 4,457,579 describes an arrangement for reducing influence of diffuse and direct reflections in a display device based on a light source emitting in a narrow band said display device comprising an absorption filter having a pass band enclosing the center frequency of the light source said absorption filter being placed in the beam path between the light source and the observer and immediately adjacent reflecting means, the bandwidth of the filter being wider than the bandwidth of the light source, but considerably narrower than the spectral bandwidth of the eye.

U.S. Pat. No. 5,576,886 describes an aircraft head-up display with a combiner using a thin film dielectric reflector with a contoured reflectance spectrum of a narrow bandwidth that matches the spectrum of the light output of a cathode-ray tube whose phosphors produce a narrow bandwidth light output used to create visual data for display to the pilot. The dielectric combiner is constructed with a dielectric coating made up of ion deposited layers, with alternate layers having different indices of refraction and possibly different thicknesses near one quarter wavelength thick. The resultant combiner transmits ambient light essentially without attenuation at all visible light frequencies except those frequencies of the visual data produced by the CRT phosphors, which are reflected into superposition with the background viewable through the combiner.

U.S. Pat. No. 4,447,128 describes a diffraction grating head up display is disclosed which blocks solar radiation from impinging upon and washing out the image of display information on an optical display device. This is accomplished by means of a filter such an optical element made of photochromic material which is positioned between the display information surface and relay optics lenses, preferably at the back focal plane thereof, so that focused solar radiation darkens a localized spot in the photochromic material. The darkened spot blocks the solar energy but reversibly lightens after the focused solar energy is removed. This photochromic material allows substantially unimpeded transmittance of the image of the display information except at the darkened spot. Also included in the optical system are a folding reflector and a combiner lens element which combines and superimposes the image of the display information on the scene being viewed when an observer looks through the combiner element. This combiner element is a diffraction grating holographic lens which is reflective or diffractive of a narrow bandwidth of light which includes the narrow bandwidth light of the display information.

U.S. Pat. No. 4,930,847 describes a method for producing multicolor holographic optical elements useful in presentation of multicolor holographic images in a head-up display (HUD) system. Because of restricted geometries, such HUDs should allow for reconstruction of wavefronts employing all readout beams coming from the same direction, with the reconstructed wavefront being cast in a specified direction. A first method for producing a multicolor HOE satisfying these conditions makes all recording at the same wavelength but with varying record geometries. A second method for producing multicolor HOEs employs the same record geometries but uses varying wavelengths of recording light. This allows the recording to be made under conditions where the diffraction efficiency of the resulting HOEs is controlled, as are the displayed colors. As the consequence of this, the multicolor HOE can be made under conditions which allow the Bragg condition to be satisfied for each of the readout wavelengths allowing a uniformly bright multicolor wavefront to be reconstructed. A third method for producing such HOEs is to further change the recording geometry by redirecting all the recording wavefronts through the same angular interval. This minimizes the crosstalk which occurs between images recorded at different wavelengths. Also disclosed are apparatus for display of each of the HOEs.

U.S. Pat. No. 4,218,111 describes an integrated optical design of head-up displays suitable for use in aircraft cockpits and the like. The display system is comprised of a holographic optical element used as the combiner for presenting a direct view of the exterior on which are superimposed image signals generated by a source device such as a cathode ray tube and transmitted to the combiner through an optical system including a relay lens containing tilted and decentered optical elements to compensate for the aberration present in the holographic optical element. It further describes four relay lens design forms particularly suited for use in the design of such holographic head-up displays. The disclosure includes integrated designs in which (a) the holographic element may or may not be constructed with aberrated wavefront and (b) a beam splitter is incorporated for insertion of a stand-by sight, possibly also being tilted for the correction of aberrations.

U.S. Pat. No. 6,175,431 describes a projection system and a method of displaying a projected input image on a projection screen of the system utilize one or more reconfigurable holographic optical elements (HOEs) to optically manipulate propagating light in the system. The reconfigurable HOEs may be configured to perform simple optical functions that are commonly associated with traditional optical devices, such as lenses, prisms and mirrors. However, the reconfigurable HOEs may also be configured to perform sophisticated optical manipulations, such as varying the light intensity toward a specific direction and generating virtual (holographic) images. Each reconfigurable HOE includes a hologram that is sandwiched between two electrode layers. The hologram is a holographic photopolymeric film that has been combined with liquid crystal. The hologram has an optical property that changes in response to an applied electrical field. The reconfigurable HOEs may be included in a color filter of the system to selectively diffract tristimulus color lights to a display panel in order to provide a color display of the input image that is projected onto the projection screen. The reconfigurable HOEs may also be included in a projection optics to magnify the projected image on the projection screen and/or redirect the projected image to form a tiled image on the projection screen. Furthermore, the reconfigurable HOEs may be used in the projection screen to vary the light intensity toward specific viewing positions. In one application, the reconfigurable HOEs in the projection screen allow the system to present the display image in a stereoscopic form.

Holographic combiners are also known in the literature. Wood, et al. discuss the practical aspects of forming holographic combiners.[2] This paper focuses on image brightness, not depth of focus. Hurst et al. describe the use of holographic wedges in heads up displays.[3] Smirnov et al. describe full color reflection type holographic screens, but focus on the hologram fabrication process.[4] Blumenfeld and Amitai describe a heads up display using 3 lenses and a diffractive element.[5] Ramsbottom, et al. describe the use of holography in automotive heads up applications, where images are formed in space near to the automobile.[6] Bartlett describes the use of holographic optical elements in heads up displays, but uses a 15 nm spectral source, which is not sufficiently narrow to allow sharp images, and does not address the apparent distance of the image created by the heads up display.[7]

[2] R. B. Wood, M. A. Thomas, "Holographic head-up display combiners with optimal photometric efficiency and uniformity", SPIE Vol. 1289 Cockpit Displays and Visual Simulation (1990)
[3] A. E. Hurst, P. J. Rogers, "Use of holographic wedges in large field of view head-up displays", SPIE Vol. 2404, pp. 286–292, 1995
[4] V. V. Smirnov, et al., "A full color reflection type holographic screen", SPIE Vol. 3293, pp. 175–182, (1998)
[5] Y. Blumenfeld, Y. Amitai, "Designing a head up display system with a hybrid diffractive-refractive lens", SPIE Vol. 2426, pp. 366–372 (1995)
[6] A. Ramsbottom, S. Sergeant, D. Sheel, "Holography for automotive Head-up-displays", SPIE Vol. 1667 Practical Holography, pp. 146–164, (1992)
[7] C. T. Bartlett, "The head up display for the advanced cockpit", SPIE Vol. 2219 Cockpit Displays, pp. 22–33 (1994)

All the heads up displays are limited in resolution and the distance of the virtual image. Thus, a better system for providing heads up displays is needed for low cost, high resolution, and high information content, and this solution is provided by the following invention.

SUMMARY OF THE INVENTION

It is therefore an object of the present invention to provide a heads up display that avoids blurring;

It is a further object of the present invention to provide a heads up display that provides a virtual image at a distance much larger than presently achievable;

It is a further object of the present invention to provide a heads up display having a light source having a narrow wavelength range;

It is a further object of the present invention to provide a high optical efficiency;

It is a feature of the present invention to provide that the light source has a wavelength range of less than 2 nm;

It is a feature of the present invention to provide that the light source has at least two non-overlapping wavelength ranges, with each wavelength range being less than 2 nm;

It is an advantage of the present invention that the virtual image is high resolution and can be located at a distance from several inches to several miles from the equipment.

These and other objects, features, and advantages of the invention are accomplished by a heads up display comprising equipment for generating a virtual image in the field of view of an observer. The equipment includes a light source having a wavelength range less than 2 nm.

BRIEF DESCRIPTION OF THE DRAWINGS

The foregoing and other objects, features, and advantages of the invention will be apparent from the following detailed description of the invention, as illustrated in the accompanying drawings, in which:

FIG. 7 is a block diagram of a system illustrating geometric distortion; and

FIG. 8 is a block diagram of the embodiment of the heads up panel system of FIG. 6 showing how compensation is provided to the LCD display to overcome geometric effects by pre-distorting the image provided by the LCD panel.

DETAILED DESCRIPTION OF THE INVENTION

Figure 1:
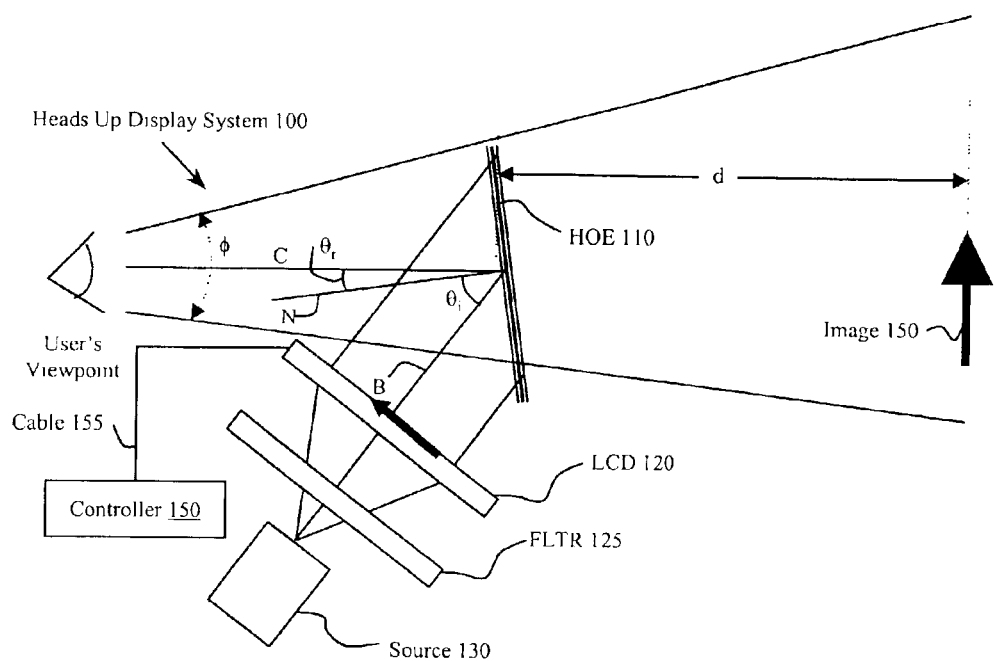
FIG. 1 is a block diagram of a heads up panel system of the present invention including an LCD panel, a narrow bandwidth light source, a filter, a holographic optical element, and a controller for adjusting the mask provided by the LCD panel.

The present invention improves equipment for generating a virtual image in the field of view of an observer. The virtual image may be several inches to several miles from the equipment. Such equipment includes a light source that shines a pattern on a holographic optical element (HOE). The observer looks through the HOE and sees the virtual image of the pattern as well as real objects in the field of view. In the case of a VR or simulator, no real scenery is involved. The HOE can cover only a portion of the field of view to as much as the entire field of view. The HOE can also be located so as to cover none of the field of view. The present inventors found that by providing a very narrow range of wavelengths, less than 2 nm, the resolution of the virtual image is significantly improved. They also found several schemes for providing patterned light having such a narrow range of wavelengths. These schemes include providing a low-pressure gas discharge, a gas panel display, a laser, or an LED with a filter. The low pressure gas may have several emission lines at least one of which has a very narrow wavelength range; the others are filtered out with a pass band narrow enough to exclude other emission lines. In other schemes, the HOE itself filters out the other emission lines, so no separate narrow band filter is required. The pattern can be formed with a fixed mask, such as a stencil or a silhouette, or it can be formed with an adjustable mask, such as an LCD display. The narrow wavelength range light can shine through the mask onto the HOE. Alternatively, the light source can itself be patterned, as in a neon sign, or the narrow wavelength range light source can be pixelated to provide an adjustable pattern, as in a gas panel display.

The HOE is configured as a reflector that is used to superimpose, or combine, a virtual image of the LCD within the field of view of a user. The system of the present invention forms a focused image at high resolution at a much greater distance from the user than was previously possible. The observer therefore need not change his or her focus from the distant scene to view the projected image.

The present invention is an apparatus to form virtual images at a predetermined focal length that exceeds the ability of the eye to perceive stereo vision, i.e., greater than 20 feet.

Holographic image combiner system 100 includes a source 130, an optional filter (FLTR) 125, a liquid crystal display (LCD) 120, and a holographic optical element (HOE) 110. Source 130 is disposed to emit light that passes through FLTR 125 and LCD 120 along optical path B, and then strike holographic optical element 110. HOE 110 reflects light from source 130 toward a user. HOE 110 has a normal direction perpendicular to the surface of HOE 110, and light from source 130 strikes HOE 110 at an angle $\theta_i$. Light from source 110 reflects from HOE 110 at an angle $\theta_r$. In a given application, the user observes at least a portion of a scene within a field of view. HOE 110 is disposed along the line of sight between the user and a portion of the scene. It is desirable, though not critical that HOE 110 be disposed within the field of view of the user.

HOE 110 is a Bragg hologram formed using well-known techniques.[8,9,10] HOE 110 has a front side and a back side, with the front side oriented toward the user. Such holograms are used in the present invention as narrow bandwidth reflectors with a preferred bandwidth of 15 nm centered about the preferred wavelength. However, narrower bandwidths are also suitable, viz. 10 nm as are broader bandwidths, viz. 20 nm. Hologram bandwidths of approximately 10 nm are desirable from the perspective of limiting the range of wavelengths the HOE reflects, but broader bandwidths, which translate directly to broader angular bandwidth, and are desirable from the point of view of allowing the user to move somewhat and still see image 150.

[8] P. Hariharan, *Otpical Holography*, Cambridge University Press, 1984.
[9] P. R. A. Syms, *Practical Volume Holography*, Oxford University Press, 1990.
[10] H. J. Caulfield, ed., *Handbook of Optical Holography* Academic Press, 1979.

HOE 110 may have astigmatism depending on the distance between the HOE and the virtual image 150. Such astigmatism differs in orthogonal directions within a plane perpendicular to the direction defined by the location of the HOE 110 and the position of virtual image 150. For a given HOE, each point on LCD 120 that is reflected by HOE 110 can be seen by the observer as a virtual image in space on the other side of HOE 110 from the observer at a location that depends on $\theta_i$, $\theta_r$, and the wavelength of light. In particular, for given values of $\theta_i$ and $\theta_r$, the position of an imaged point is sensitively dependent on wavelength. The spectral diffraction efficiency (SDE) of Bragg holograms can be adjusted, again using well-known techniques. The SDE has a FWHM value that determines the brightness of a displayed image, and a spatial frequency that determines the apparent distance a projected object appears. HOE 110 has the property that light incident at the design wavelength (plus a small bandwidth) is reflected, and all other light is transmitted. HOE 110 has an additional property that the focal length of the image formed using HOE 110 is wavelength dependent. This wavelength dependence causes a hologram illuminated with a broadband source, e.g. white light, to smear.

The design criteria for making HOE 10 is to suppress the zeroth order reflection, and to maximize light directed into the first order reflection. Such concepts are well known to those skilled in the art. For clarity, $\theta_i$ and $\theta_r$ are shown in FIG. 1 at angles far from either 0 degrees or 90 degrees. However, specific values chosen for $\theta_i$ and $\theta_r$ depend on the specific application of the holographic combiner system. In a preferred embodiment, $\theta_i$ is close to 45 degrees and or is close to 12 degrees. Choosing $\theta_r$ close to zero maximizes the cross sectional area that can be seen by the user, but is not critical. $\theta_i$ can be as large as 60 degrees. In general, $\theta_i$ can be much as approximately +/−85 degrees, and can be on either side of HOE 110 (as described below in other embodiments). (Edge-on illumination of LCD 120 requires that LCD 120 be anamorphic, and for HOE 110 to spread the image out.) There is no sharp cutoff angle beyond which the apparatus of the present invention ceases to function, but the amount of correction required for coma, spherical aberrations and linear distortion caused by the hologram does change and must be accommodated either in the generation of the HOE 110 or in the image displayed LCD 120. It is well known that image correction can be accomplished using optical elements of various kinds, each of these accommodates the distortions. These methods can include lenses that distort the output of the image produced by the LCD 120 in order to compensate for the aberration of the HOE 110 such as indicated in U.S. Pat. No. 4,218,111. Other methods that could be employed, that are well known to those practiced in the arts of holography utilize distortion of the image or distortion of the wavefront of the recording illumination to accomplish the same effect. Accommodating the undesired distortion can mean the intentional application of an anamorphic distortion that is its inverse. As is well known for creating synthetic holograms, anamorphic correction can also be accomplished by providing images with opposite anamorphic distortions displayed on a mask or on an LCD. The anamorphic distortions on the LCD are provided by a controller using commercially available software. The present inventors were first to provide this idea in the field of heads up displays to provide distortion correction and, along with narrow bandwidth, further improve multicolor virtual image displays. In addition HOE 110 can be produced with minimum distortions to the image by interposing optical elements into the recording of the hologram to accommodate distortion, as is well known in the art.

Source 130 is a narrow band light source having an emission spectrum with a full width half maximum (FWHM) that is preferably 0.5 nm or less, but can be as large as 5 nm for applications that do not require premium performance. A preferred light source is a low-pressure gas discharge lamp (along with a power supply), e.g. mercury, hydrogen, neon, helium, sodium, cadmium (or other metal vapor), krypton, xenon or mixed gas lamp that has emission lines in the visible wavelength range. Of available colors, green is preferred for monochromatic systems because it is in the most sensitive region of visible perception. Mercury is preferred because it has an emission spectrum that includes a strong emission line at 546.07 nm[11], which is perceived by the eye as green. The preferred wavelength for operating the present invention is 546.07 nm, e.g. part number HR 175 A39/CP from GE. The emission spectrum of mercury also includes emission lines at 365 nm, 405 nm, 435.83 nm, and 614.95 nm that can also be used. Low-pressure gas discharge lamps that use a combination of gases, e.g. mercury and hydrogen, or mercury and neon can also be used. Though sodium discharge lamps can be used, the primary emission line of sodium is a doublet with two 0.1 nm emission lines separated by 0.5 nm. It is difficult (mainly expensive) to separate the two wavelengths. Since both wavelengths propagate, both wavelengths create images, so the user sees a double image (which can be interpreted as slight blurring depending on the visual acuity of the user). However, for many applications the image so formed is still better than images formed using existing systems.

[11]CRC Handbook of Chemistry and Physics, 69$^{th}$ Edition, CRC Press 1989.

Numerous alternate light sources can be used in place of a low-pressure gas discharge lamp. For example, an LED operating at 670 nm and having a spectral width of 30 nm can be used. In this case, the bandwidth of FLTR 125 determines image quality, so a FWHM of 2 nm or less is preferred. Although an LED combined with a filter works in the present invention, this combination is less efficient than a gas discharge lamp because a significant amount of light must be discarded.

Semiconductor lasers can also be used in this configuration since their spectral width in the visible is typically 0.2 nm. However, laser diode output power is of the order of milliwatts, so many laser diodes would be required. Unfortunately, the wavelength of peak power varies from laser to laser, so a large number of lasers would have to be sorted to find a subset with comparable wavelengths to be combined to achieve peak power. This approach is very expensive. A variation on this approach is to use an array of vertical cavity surface emitting lasers (VCSELs), where each VCSEL constitutes a single pixel. VCSELs also offer the benefit of ~0.6 nm bandwidth, with low temperature sensitivity.[12]

[12]http://content.honeywell.com/vcsel/advantage/optical.stm

The operating wavelength of such lasers can also be tuned slightly, which facilitates keeping the wavelength within the reflectance bandwidth of the HOE.

Another alternative light source is an arc discharge lamp. In this case, the spectral distribution is very broad, i.e., it is essentially white light. As with using an LED, using an arc discharge lamp requires the filter to eliminate all but a small amount of light. Thus, though this approach works, it is very inefficient.

Yet another light source is a gas or solid state laser, e.g. a HeNe laser operating at 632.8 nm +/−0.015 nm, or a frequency doubled Nd:YAG laser operating at 532 nm, or an excimer laser.

However, gas lasers such as HeNe are inefficient, and Nd:YAG lasers are not only bulky, but expensive and require cooling, too. In addition, the amount of light output per unit volume of the source is very small. Furthermore, all lasers pose a problem of laser speckle, which would have to be eliminated using multiple laser sources or phase scramblers before lasers could compete with the low-pressure gas discharge lamps of the preferred embodiment.

To appreciate the value of the preferred embodiment, consider that a sodium lamp requires 18 W of input power to produce about 4 W of output power in a 0.5 nm emission spectrum. The cost of the lamp and the ballast is approximately $40. In contrast, a HeNe laser that consumes 14 W of input power produces only a few milliwatts of optical power in a 0.1 bandwidth and cost approximately $80.

FLTR 125 is an optional narrow band optical filter with a center wavelength that is substantially the same as the preferred wavelength of the system, viz., 546.07 nm. The bandwidth of FLTR 125 is preferably less than 5 nm if FLTR 125 serves to limit the bandwidth of the light. If FLTR 125 serves to limit other wavelengths from adjacent emission peaks from reaching HOE 110, then the bandwidth of FLTR 125 must be sufficiently narrow that such light does not reach HOE 110. For example, if the adjacent emission peaks to a desired emission line at 435.83 nm are at 405 nm and 614.95 nm, then a bandwidth of 20 nm would be sufficient to restrict the light at 405 nm and at 614.95 nm from reaching HOE 110 and remain clear of light at 405 nm. FLTR 125 can be omitted if the bandwidth of HOE 110 is small enough to be unresponsive to all but a single emission line of source 130.

LCD 120 is a liquid crystal display whose transparency is spatially controllable to allow light to pass through selected regions of LCD 120. In this embodiment, a monochromatic LCD is preferred, e.g. model LM64P12 from Sharp Electronics, so that as clear an image as possible is formed. Other LCDs can be used, including multicolor LCDs, but the images formed with these LCDs are less bright than those formed with monochromatic LCDs because multicolor LCDs have pixels with bandpass filters that do not align consistently with the stable emission lines of the preferred embodiment, viz., 435.83 nm. LCD 120 can also be a plasma display panel with individually addressable pixels that emit light in accordance to the composition of the gas enclosed within each pixel, e.g. Display/Memory Unit Model number DA-142-A from Interstate Electronics Corp. It is also necessary to synchronize the image wit the light source or use a high frequency ballast with the lamp. LCD 120 can also be a ferroelectric LCD panel.

Controller 150 is a computer equipped with a CPU, memory and I/O capability. Controller 150 is electrically connected to LCD 120 via cable 155.

In operation, controller 150 communications via cable 155 data to be displayed on LCD 120. Source 130 emits light that passes through FLTR 125, which strips off un-needed light from the light emitted by source 130. Thus, light passing through FLTR 125 and incident upon LCD 120 forms an image. Light from LCD 120 propagates toward HOE 110, and light within the reflection band of HOE 110 is reflected toward the user, and the user perceives a virtual image 150 located in space a distance d in back of HOE 110.

Figure 2:
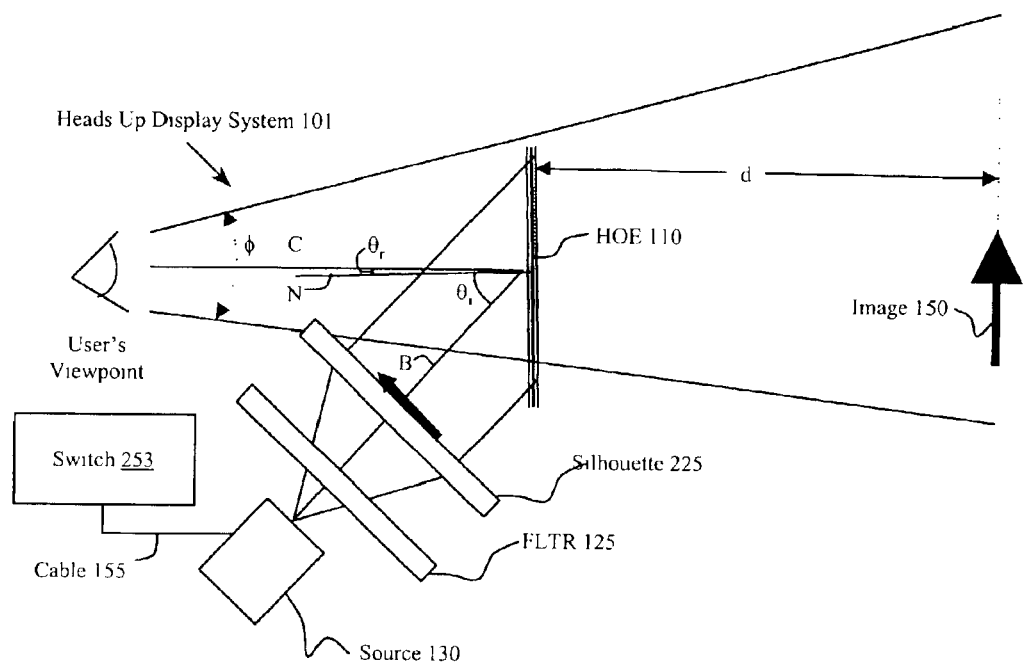
FIG. 2 is a block diagram of an alternate embodiment of the heads up panel system in FIG. 1 in which the LCD panel is replaced with a fixed mask.

In another embodiment, holographic image combiner system 101 is identical to system 100 except controller 150 is replaced by a switch 253 (or shutter) connected to source 130 via cable 155, and LCD 120 is replaced by a silhouette 225, as shown in the FIG. 2. A switch (or shutter) can be necessary when using a lamp that takes a long time to turn on. The switch includes a sensor that triggers the switch (or shutter) to turn source 130 on or off depending on the nature of the sensor. In its simplest form there is no sensor.

In operation, switch 253 turns source 130 on, and light emitted by source 130 passes through selected regions of silhouette 225, and light reflected from HOE 110 is perceived by a user as virtual image 150.

Figure 3:
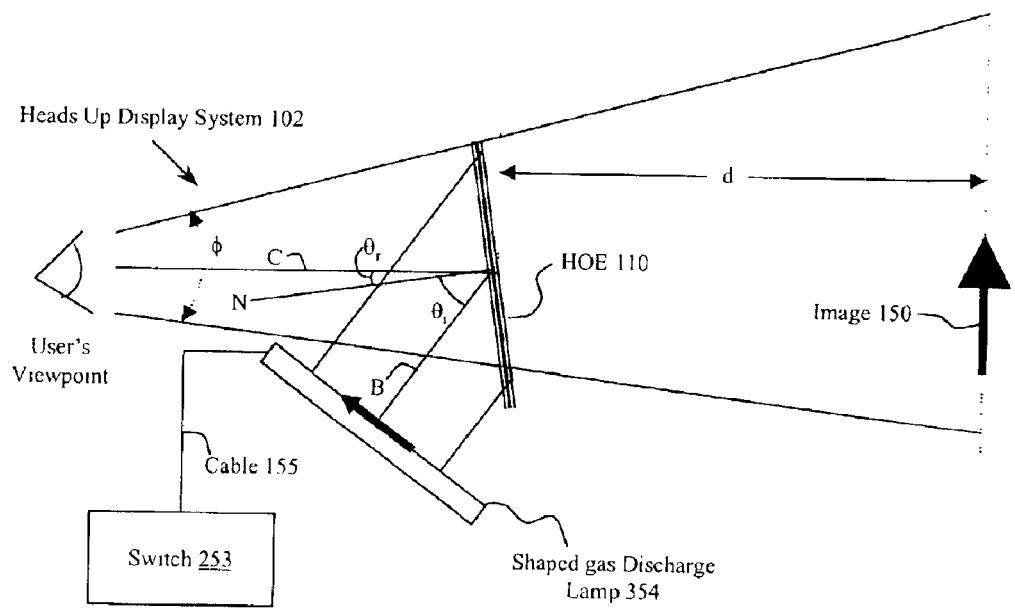
FIG. 3 is a block diagram of another alternate embodiment of the heads up panel system of FIG. 1 in which the LCD panel is replaced with a shaped gas discharge lamp, such as a shaped neon lamp.

In yet another embodiment, system 102 is identical to system 101 except that LCD 120 and FLTR 125 are replaced by one or more shaped gas discharge lamps 154, as shown in FIG. 3. Shaped gas discharge lamps 154 are gas discharge lamps shaped in a predetermined pattern (e.g. a symbol or a text as found in neon signs). In addition, controller 150 is replaced by switch 153 (or shutter) connected to the gas discharge lamps In operation, activating-switch 253 causes power to be applied to shaped gas discharge lamps 354, and light emitted by them propagates to HOE 110, and the user sees the image presented to HOE 110 as described in the core embodiment.

Core Embodiment with Distortion Compensation

Figure 4:
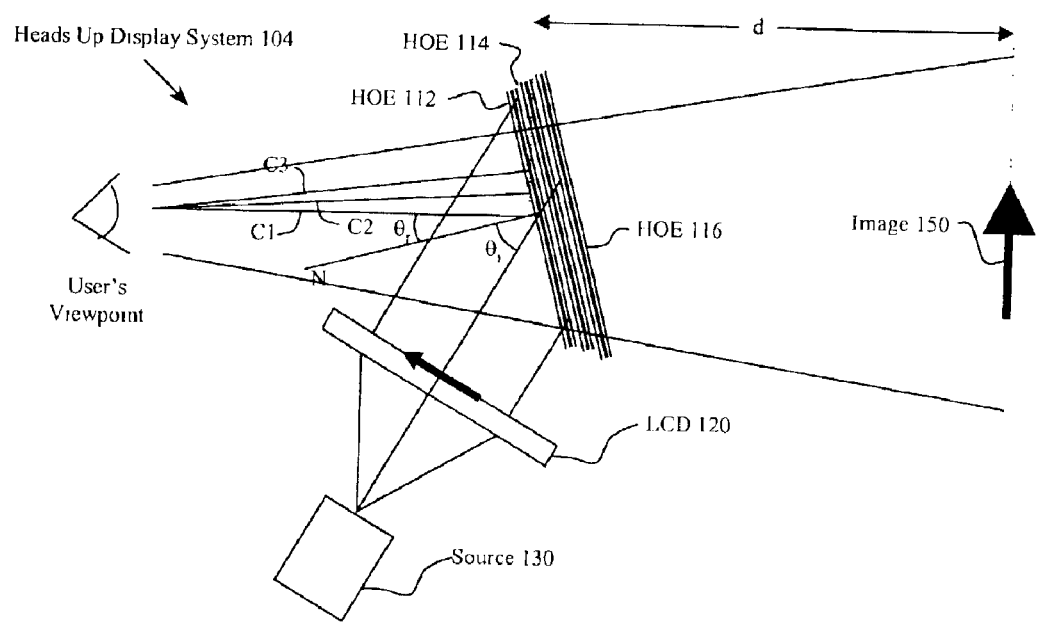
FIG. 4 is a block diagram of another alternate embodiment of the heads up panel system of FIG. 1 in which multiple holographic optical elements are used to provide the virtual image in more than one color or in full color.

System 104, shown in FIG. 4, is identical to monochrome system 100 except that FLTR 125 is omitted, and HOE 112, HOE 114, and HOE 116 replace HOE 110.

Source 130 is preferably a mercury-based, low-pressure discharge lamp that emits light at multiple wavelengths as described above. Of particular interest are the emission lines at 435.83 nm, 546.07 nm, and 614.95 nm. Alternatively, light source 130 can be implemented using three different colored LEDs in combination with narrow bandpass filters for each respective color.

HOE 112 is a holographic optical element designed to reflect light at 435.83 nm. HOE 114 is a holographic optical element designed to reflect light at 546.07 nm. HOE 116 is a holographic optical element designed to reflect light at 614.95 nm.

In operation, multi-spectral light emitted by source 130 strikes FLTR 127, which allows light at 435.83 nm, 546.07 nm, and 614.95 nm to pass through. Light at these three wavelengths then passes through LCD 120, which forms a three-colored object that is to be projected. Light at the three wavelengths then strike HOE 112, which reflects 435.83 nm light and allows 546.07 nm and 614.95 nm light to pass through. Thus, light from source 130 that passes through HOE 112 includes 546.07 nm and 614.95 nm light, and these two colors of light strike HOE 114. HOE 114 reflects 546.07 nm light, and allows 614.95 nm light to pass through. Of the light originating from source 130, only the 614.95 nm light reaches HOE 116, which reflects it.

The 614.95 nm light reflected by HOE 116 then strikes HOE 114, which is transparent to 614.95 nm light, so the light passes through HOE 114 and strikes HOE 112 along with the 546.07 nm light reflected by HOE 114. The 614.95 nm light reflected by HOE 116 and the 546.07 nm light reflected by HOE 114 then strike HOE 112, which is transparent to these two wavelengths. Consequently, the light reaching the user from source 130 includes light from all three colors. An equivalent structure that provides the same functionality as the combination of HOE 112, HOE 114, and HOE 116 is to make a single HOE with multiple (i.e., three) exposures.

When using a combination of HOEs to reflect individual colors, each must be formed with its diffraction efficiency adjusted for color equalization. Likewise with a single HOE formed to with more than one exposure, the diffraction efficiency of each exposure must be done to compensate for differences in the intensity of the colors.

Figure 5:
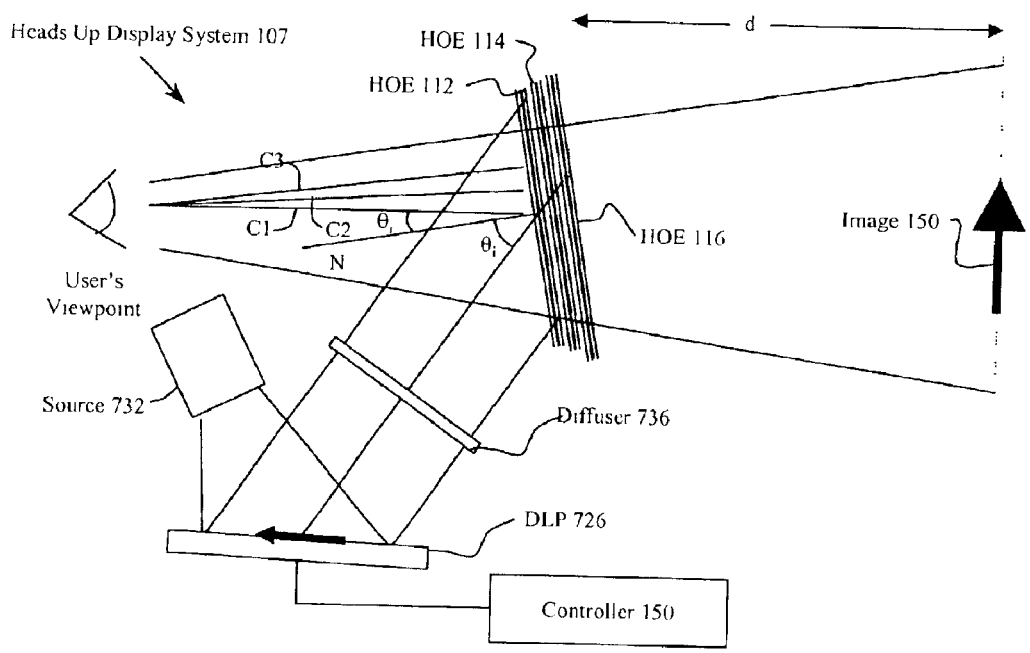
FIG. 5 is a block diagram of another alternate embodiment of the heads up panel system of FIG. 1 in which the LCD panel is replaced with an array of adjustable micromirrors.

System 107, shown in FIG. 5, is identical to monochrome system 100 except that FLTR 125 is omitted, LCD 120 is replaced by digital light projector (DLP) 726, diffuser 736 is inserted in the optical path between DLP 726 and HOE 112, and source 130 is replaced by source 732.

Digital light projector 726 is a digital micro-mirror device (DMD) that has an array of mirrors that deflect in response to a command from controller 150. With regards to home theater applications, several manufacturers, such as Hitachi, Panasonic, and Mitsubishi are producing rear-projection DLP sets for the consumer. Also, for those who favor front projection systems, several manufacturers, such as Runco, Davis, Marantz, and Dreamvision make units suitable for both home theater and business applications. DLP 726 further includes a color filter wheel (not shown) that selectively passes color. (Alternatively, DLP 726 can include red-green-blue LEDs that are sequentially turned on sufficiently fast and in proportion to the amount of color required that the eye perceives the correct color.)

Source 732 is a low-pressure discharge lamp using mercury, though other gases such as hydrogen or neon can be used. Also combinations of gases can be used to provide specific wavelengths of light and wavelength combinations.

In operation, source 732 emits a multi-line emission spectrum that illuminates the mirrors in DLP 726. Controller 150 sends a signal to DLP 726, which deflects a fraction of the mirrors (anywhere from 0% to 100%), thus causing the light from source 732 to be deflected towards diffuser 736 and on to HOE 112, HOE 114, and HOE 116. The light propagating from DLP 726 to HOE 112 is polychromatic. The response of the HOE elements to the propagation of light to them is as described above. System 732 exploits the wavelength specific reflectance of the holographic optical elements, thus eliminating the need for spectral filter 125.

Figure 6:
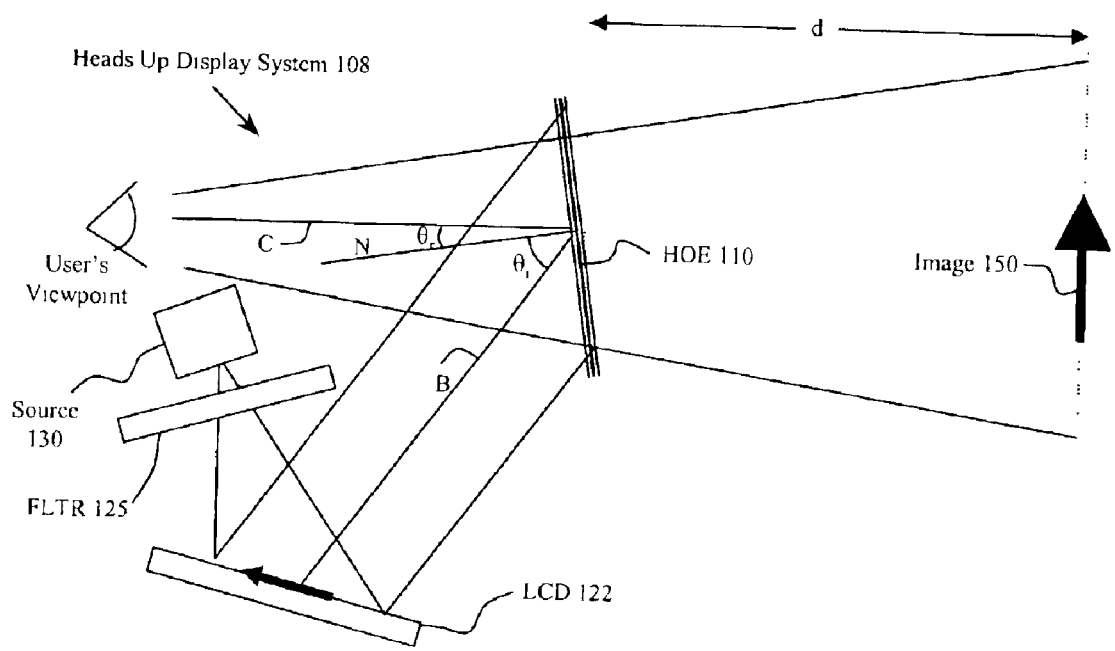
FIG. 6 is a block diagram of another alternate embodiment of the heads up panel system in FIG. 1 in which light is reflected off the LCD panel instead of being transmitted through the LCD panel.

In some applications, it is not practical to use a transmissive LCD, and a reflective LCD can be used. System 108, shown in FIG. 6, is identical to system 100 except that reflective LCD 122 having a diffusive surface replaces transmissive LCD 120. Operation of system 108 is identical to that of system 100 except that light emitted by source 130 reflects from LCD 122 after passing through FLTR 125.

FIG. 7 shows distortion in image 150 caused by the geometry of the optics, in which the image source LCD 120 is at an angle with respect to the user's viewpoint. FIG. 8 shows one way to compensate or correct for this distortion by using controller 150 to predistort the original image on the image source, LCD 120 by an amount to compensate for the angle and provide image 50 to appear without distortion.

While several embodiments of the invention, together with modifications thereof, have been described in detail herein and illustrated in the accompanying drawings, it will be evident that various further modifications are possible without departing from the scope of the invention. For example, combinations of two or more of the above described embodiments can be used to further improve the performance of a HUD. Nothing in the above specification is intended to limit the invention more narrowly than the appended claims. The examples given are intended only to be illustrative rather than exclusive.

What is claimed is:

1. A display comprising equipment for generating a virtual image in the field of view of an observer along with an ambient image, said equipment comprising at least one light source having a full-width-at-half-maximum-wavelength range less than 2 nm wherein said light source has sufficient brightness so the virtual image can be seen along with the ambient image.

2. The display as recited in claim 1, wherein said full-width-at-half-maximum-wavelength range is less than 0.5 nm.

3. The display as recited in claim 1, wherein said light source comprises a non-phosphor light source.

4. The display as recited in claim 1, wherein said light source comprises at least one from the group including a low pressure gas discharge lamp, a laser, a vertical cavity surface emitting array laser, and a plasma discharge panel.

5. The display as recited in claim 4, wherein said laser comprises a gas laser, a solid state laser, a semiconductor laser, or an excimer laser.

6. The display as recited in claim 4, wherein said low-pressure gas comprises one or more from the group consisting of: mercury, cadmium, krypton, helium, neon, argon, hydrogen, sodium, and xenon.

7. The display as recited in claim 4, wherein said low pressure gas discharge lamp comprises an emission line and wherein said equipment further comprises a filter to provide light at a wavelength corresponding to said emission line and strip out light corresponding to other wavelengths.

8. The display as recited in claim 6, wherein said gas has a plurality of emission lines and wherein said equipment further comprises an optical element responsive to only one of said emission lines.

9. The display as recited in claim 8, wherein said optical element comprises a holographic element.

10. The display as recited in claim 9, wherein said holographic element reflects light in the wavelength range of 539 nm to 553 nm.

11. The display as recited in claim 9, wherein said holographic element provides said virtual image.

12. The display as recited in claim 1, wherein said equipment further comprises an image source.

13. The display as recited in claim 12, wherein said image source comprises at least one from the group, an LCD, a mask, a phosphor free plasma display, a shaped gas discharge tube, and an array of adjustable micro-mirrors.

14. The display as recited in claim 1, further comprising a holographic element.

15. The display as recited in claim 14, wherein said equipment further comprises an image source.

16. The display as recited in claim 14, wherein said holographic element combines the virtual image with the ambient image, and wherein said holographic element provides multiple colors undistorted in the virtual image appearing to an observer as converging from the same distance as the ambient image.

17. The display as recited in claim 14, wherein said holographic element provides color filtration.

18. The display as recited in claim 14, wherein said holographic element is fabricated of at least one from the group including a plastic, photopolymer, photographic emulsion, and etched glass.

19. The display as recited in claim 16, wherein the display comprises a heads up display.

20. A heads up display comprising equipment for generating a virtual image in the field of view of an observer, said equipment comprising a low-pressure gas discharge light source and a mask, said gas discharge light source for providing light having a full-width-at-half-maximum-wavelength range less than 2 nm.

21. The display as recited in claim 20, wherein said mask comprises a fixed mask or an adjustable mask.

22. The display as recited in claim 21, wherein said adjustable mask comprises an LCD display or an array of mirrors.

23. The display as recited in claim 20, wherein said equipment further comprises a holographic optical element (HOE), wherein light from said mask is directed toward said HOE for forming said virtual image.

24. A heads up display comprising equipment for generating a virtual image in the field of view of an observer, said equipment comprising a pixilated display that provides light having a full-width-at-half-maximum-wavelength range less than 2 nm, wherein said display provides light having sufficient brightness so said virtual image can be seen along with an ambient image.

25. The display as recited in claim 24, wherein said pixilated display emits light having a wavelength range less than 2 nm.

26. The display as recited in claim 24, wherein said pixilated display emits light having a wavelength range greater than 2 nm, said equipment further comprising a filter having a pass band range less than 2 nm.

27. A display comprising equipment for generating a virtual image in the field of view of an observer, said equipment comprising a holographic optical element, an image source, and a light source for providing light having a full-width-at-half-maximum-wavelength range less than 2 nm, wherein said light source has sufficient brightness so said virtual image can be seen along with an ambient image.

28. The display as recited in claim 27, wherein said image source and said light source are separate units.

29. The display as recited in claim 27, wherein said image source and said light source are integral.

30. The display as recited in claim 27, wherein said integral image source and said light source comprise a pixilated display.

31. A display for an observer viewing a holographic image overlapping an ambient image, the display comprising a light source and a plurality of holographic optical elements, wherein said light source emits light centered at a plurality of wavelengths, at each said wavelength said light having a fill-width-at-half-maximum-wavelength range less than 2 nm, wherein said light source has sufficient brightness so said virtual image can be seen along with an ambient image, and wherein each of said plurality of holographic optical elements provides a holographic virtual image superimposed on the ambient image, wherein each of said holographic optical elements uses light from one of said plurality of wavelengths to provide said virtual image appearing to the observer as converging from the same distance.

32. The display as recited in claim 31, wherein said virtual images from said plurality of holographic optical elements appear to the observer as converging from the same distance.

33. The display as recited in claim 31, wherein said virtual images from said plurality of holographic optical elements provide a multicolored virtual image overlapping said ambient image.

34. The display as recited in claim 1, wherein said light source comprises a filtered broadband source.

35. The display as recited in claim 16, wherein said holographic element provides multiple colors undistorted in the virtual image.

36. The display as recited in claim 17, wherein said holographic element provides optical power.

37. The display as recited in claim 36, wherein said holographic element provides a change in focus distance.

38. The display as recited in claim 17, wherein said holographic element provides a correction for distortion.

39. The display as recited in claim 17, wherein said equipment comprises a light source emitting light centered at three wavelengths, at each said wavelength said light having a wavelength range less than 2 nm.

40. The display as recited in claim 17, wherein said holographic element comprises a narrow bandwidth reflector.

41. The display as recited in claim 17, wherein said holographic element comprises a reflector bandwidth of about 10 nm.

42. The display as recited in claim 17, wherein said holographic element comprises a reflector bandwidth of about 15 nm.

43. The display as recited in claim 17, wherein said holographic element comprises a reflector bandwidth of about 20 nm.

44. The display as recited in claim 4, wherein said low-pressure gas comprises a metal vapor.

45. The display as recited in claim 4, wherein said low pressure gas discharge lamp comprises a plurality of emission lines, wherein said equipment further comprises a plurality of filters to provide light at a plurality of wavelengths corresponding to more than one of said emission lines and strip out light corresponding to other wavelengths.

46. A display for viewing a virtual image in the field of view of an observer, comprising at least one light source and a holographic element, said light source having a full-width-at-half-maximum-wavelength range less than 2 nm, and wherein said holographic element comprises a narrow bandwidth reflector.

47. A display for viewing a virtual image in the field of view of an observer, comprising at least one light source and a holographic element, wherein said holographic element comprises a narrow bandwidth filter to provide a full-width-at-half-maximum-wavelength range less than 2 nm.

48. The display as recited in claim 47, wherein said holographic element comprises a narrow bandwidth reflector.

49. The display as recited in claim 47, wherein said holographic element includes no other filter.

50. A display for viewing a virtual image in the field of view of an observer, comprising at least one light source and a holographic element, wherein said holographic element comprises a narrow bandwidth filter to provide a full-width-at-half-maximum-wavelength range less than 20 nm.

51. The display as recited in claim 50, wherein said holographic element comprises a narrow bandwidth reflector.

52. The display as recited in claim 50, wherein said wavelength range is less than 15 nm.

53. The display as recited in claim 50, wherein said wavelength range is less than 10 nm.

54. A display for viewing a virtual image in the field of view of an observer, comprising at least one light source and a holographic element, wherein said holographic element comprises a plurality of narrow bandwidth filters to provide a plurality of separate narrow bandwidth wavelength ranges, wherein each said narrow bandwidth wavelength range has a full width at half maximum of less than 20 nm.

55. The display as recited in claim 54, wherein said holographic element comprises a plurality of narrow bandwidth reflectors.

56. The display as recited in claim 54, wherein said holographic element comprises three narrow bandwidth reflectors.

* * * * *